Patented Feb. 19, 1946

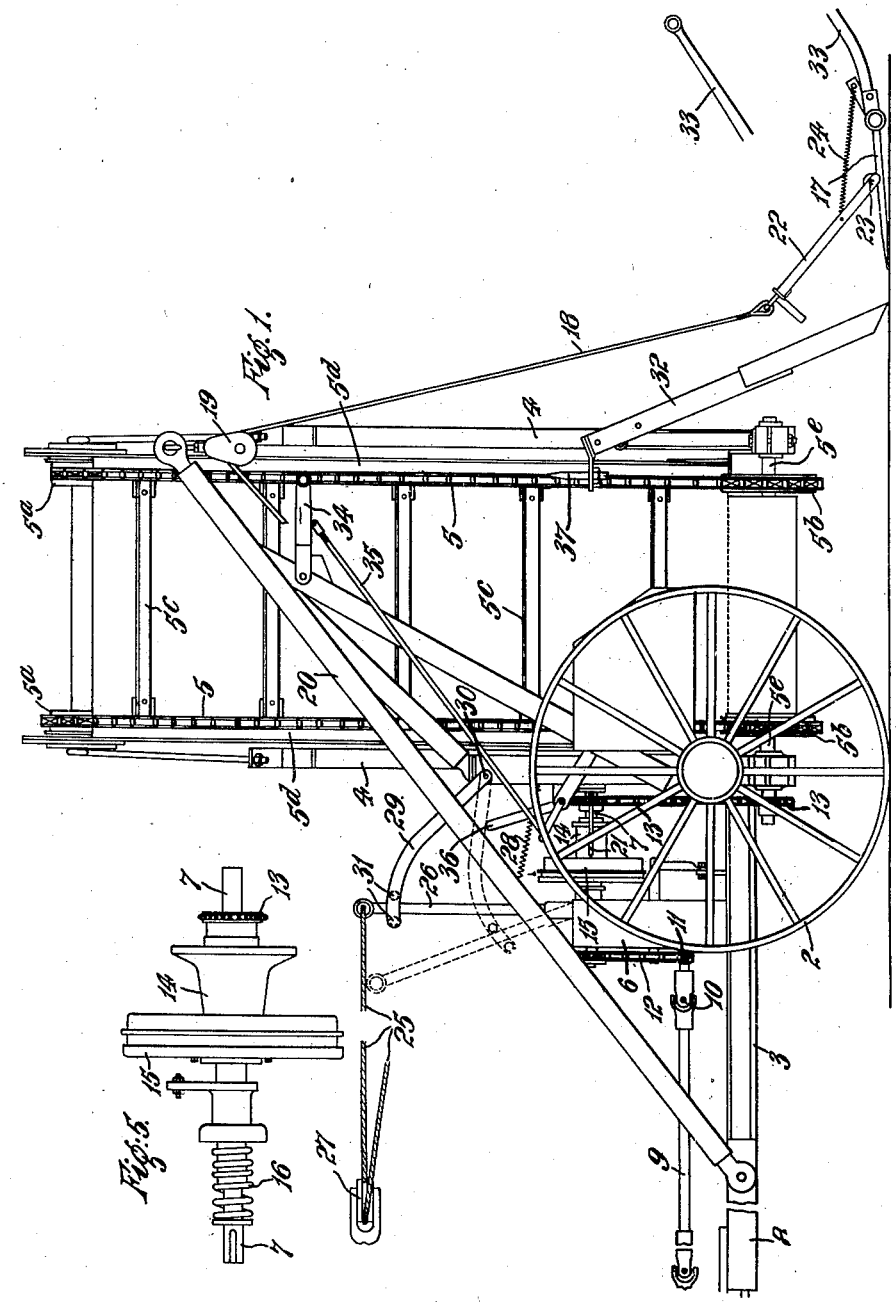

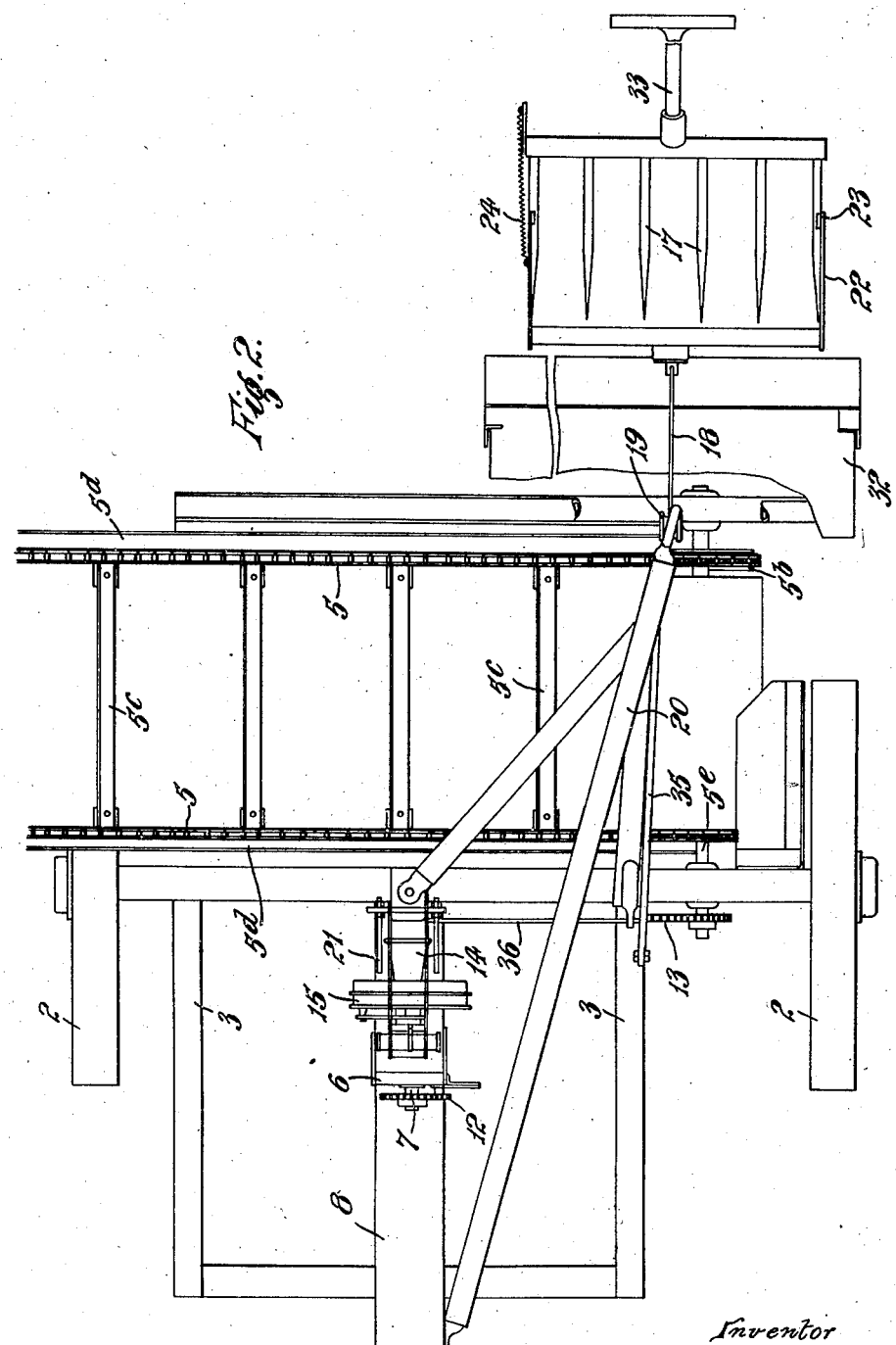

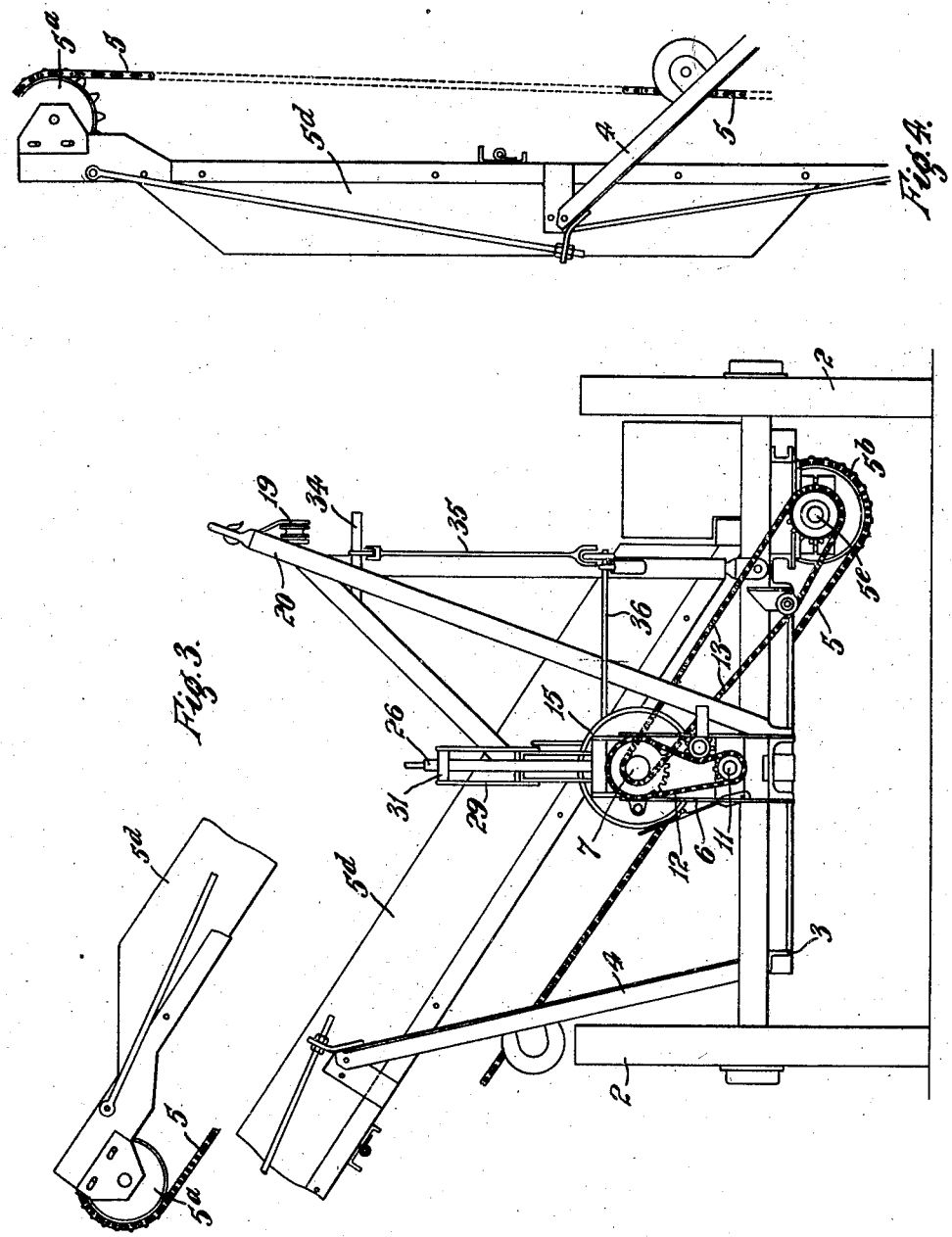

2,395,238

UNITED STATES PATENT OFFICE 2,395,238

APPARATUS FOR MOVING LOOSE MATERIAL

Leslie Basil Thwaites, Cubbington, near Leamington Spa, England

Application July 31, 1944, Serial No. 547,459
In Great Britain July 28, 1943

3 Claims. (Cl. 214—93)

This invention relates to means for shifting loose material for loading and other purposes and whilst applicable for use in moving loose material generally is particularly intended for use in loading fibrous material, such as manure from a dump onto a vehicle.

The object of the invention is to expedite the loading operation and to provide a power-driven machine or apparatus for the purpose in view which whilst being highly efficient can be manipulated and controlled with the minimum of labour.

According to the present invention the material to be shifted is fed into an elevator or conveyor by means of a manually-controlled device, such as a fork, shovel or scoop, flexibly connected with power operating means therefor.

The improved machine or apparatus comprises a supporting structure preferably mounted on wheels, an elevator which may be of the endless track type suitable for conveying loose material, a winch or equivalent winding gear, and a fork, shovel or the like attached by a cable to the barrel of the said winding gear.

The said machine, or apparatus, may either be adapted for trailing behind a tractor or motor vehicle in which case the motive power for its operation may be derived from a power take-off on the towing vehicle or may be entirely or to a large extent self-contained in which case the motive power for its operation and, if necessary, propulsion may be derived from a power unit on the machine itself.

Whether the machine or apparatus is operated from a power take-off on a towing vehicle or by its own motor, the arrangement and operation are such that when the flexibly connected power-operated fork or the like is in position for engagement with the bulk material, the winding gear is operatively connected with the power take-off, or with a motor on the machine, as the case may be, by means of a clutch. The fork or the like is then moved by the cable and winding gear into engagement with the material and drawn into position to deliver its load thereof into the elevator by which it is eventually discharged into a vehicle or wherever it is required. The arrangement is further such that when the fork with its load reaches the machine the clutch of the winding gear is automatically released thereby enabling the operator to withdraw the unloaded fork back to the dump for the next load. In the case of fibrous material, such as manure, which has a tendency to cling to the fork, there may be associated with the machine means whereby when the fork is withdrawn it is positively cleared of its load.

In the accompanying drawings:

Figure 1 is a view in side elevation of a loading machine embodying the present invention.

Figure 2 is a plan view thereof.

Figure 3 is an end view.

Figure 4 is a side view of the upper part of the conveyor.

Figure 5 is a detail view on a larger scale of the winch and clutch.

Referring to the construction shown in the drawings, the supporting structure, which is mounted on wheels 2, comprises a frame 3, supports 4 for an elevator 5, and a bracket 6 for the spindle 7 of a winch.

In the specific example shown the motive power for driving the conveyor and winch is derived from a power take-off on a tractor or other towing vehicle to which the loading machine is adapted to be attached by the draw-bar 8. The drive from the power take-off is taken by a drive shaft 9 which is connected by means of a universal joint 10 with a shaft 11 rotatably mounted in the lower part of the bracket 6. From this shaft 11 the winch spindle 7 is driven by chain and sprocket gear 12. The elevator, which is of the orthodox endless track type is arranged in an upwardly inclined position transversely of the machine and comprises a pair of chain belts 5, 5 running over top and bottom sprockets 5$^a$, 5$^b$ and connected together by a series of spaced slats 5$^c$. The upper run of the chain belts traverses an inclined trough 5$^d$ from the upper end of which the material is discharged. The spindle 5$^e$ for the bottom sprockets is driven from the winch spindle 7 by chain and sprocket gear 13.

The barrel or drum 14 of the winch is adapted for operative connection with the winch spindle by means of a clutch 15 which may be of any suitable type and is normally disengaged by means of a spring 16, as shown in Figure 5.

The fork 17 is attached to the drum or barrel 14 of the winch by means of a wire cable 18 which passes over a pulley 19 supported by stays 20 and is guided onto and off the barrel by means of fingers 21.

The connection between the cable 18 and the fork 17 is by means of a frame or stirrup member 22 which is pivoted to the sides of the fork at 23 and normally held in the raised position shown in Figure 1 by means of a spring 24.

The clutch is adapted for remote control by means of a rope or cord 25 attached to the clutch operating lever 26, and passing around a pulley 27 attached to a stationary part of the machine or tractor. The said lever is normally held in the position shown in Figure 1 with the clutch in the disengaged position and the winch drum or barrel free, by means of a tension spring 28 attached at one end to a stationary part of the machine. Associated with the clutch operating lever is a drop arm 29 one end of which is pivoted at 30 to the stationary part aforesaid whilst its other end is in sliding engagement with the clutch operating lever by means of a pair of rollers 31. The arrangement is such that when the operator pulls on the cord 25 attached to the said lever to engage the clutch,-the said arm 29 drops into the position shown in dotted lines in Figure 1 to retain the lever in the engaged position.

A ramp 32, which may be adjustable both in length and inclination, is pivotally or otherwise mounted at the side of the bottom end of the elevator 5.

In use, the machine attached to a tractor is drawn up in the vicinity of the material to be moved and the power take-off on the tractor connected with the driving shaft of the machine. The carts to be loaded will draw up underneath the upper end of the elevator alongside the machine. The operation of the machine is then as follows: The clutch 15 which connects the barrel or drum 14 of the winch to its spindle 7 being normally disengaged, the operator takes hold of the fork by the handle 33 and places it in position to engage the material. He then pulls on the rope or cord 25 attached to the clutch operating lever 26 to engage the clutch whereupon the drop arm 29 falls into the dotted line position to lock the lever with the clutch in the engaged position so that the operator can release the rope and confine his attention to the fork. The winch spindle being constantly driven through the chain drive 12 from the drive shaft 9 connected with the power take-off, now drives the drum or barrel 14 to which the pivoted frame 22 on the fork is attached by the wire cable 18. The pull of the cable first causes the fork to dig down into the material to engage a full load. The continued pull on the cable now draws the loaded fork towards and up the ramp 32. After riding up the ramp the fork continues in a vertical direction until some part of it strikes against a clutch cut-out arm 34 which, as seen in Figure 1, is connected by the rod 35 with a pivoted clutch release arm 36 which engages with and lifts the drop arm 29 to allow the lever to be moved by its spring 28 into the disengaged position and the clutch to be disengaged by its spring 16.

After operating the clutch cut-out arm, the fork, being no longer subject to the pull of its cable, drops vertically as far as the top of the ramp. In order to clear the fork of its clinging load and to allow the latter to drop onto the lower part of the elevator which is in constant motion and unaffected by the disengagement of the clutch, a series of fixed spikes 37 are arranged near the top of the ramp which when the fork drops engages between the tines thereof behind the load so that when the operator withdraws the fork the load is left behind and free to drop onto the elevator by which it is carried upward and delivered into the cart drawn up to receive it. The clutch being still disengaged and the barrel or drum of the winch free to turn on its spindle 7, the operator can now draw back the fork into a position to engage another load when the above described operations are repeated.

As already stated, the machine may be constructed as a self-contained unit and carry its own source of motive power instead of being adapted for operation from the power take-off of a towing vehicle as above described. In this case the machine may be provided with an electric motor for connection with a suitable available supply of electric current, or the motive power may be derived from an internal combustion engine which may also be employed for propelling the machine. In all other respects the machine may be substantially the same as above described and adapted for use in a similar manner.

Owing to the flexible connection of the fork by means of the cable 18 which may be of any desired length, the operator can work toward the ramp from any direction within, say, 90° on each side of a line normal to the ramp and the area which can be cleared of material from one position of the machine is only limited by the length of the cable.

The complete operation can be controlled by a single operator.

I claim:

1. A machine for the purposes described comprising a supporting structure mounted on wheels, winding gear and an elevator carried thereby and adapted for power operation, a clutch for controlling the operation of said winding gear, and automatic locking device for retaining said clutch in the engaged position, a fork connected by a cable with said winding gear for feeding loose material to said elevator, said fork operating to release said automatic locking device to allow the clutch to become disengaged prior to the end of each feeding operation.

2. A machine for the purposes described comprising a supporting structure mounted on wheels and provided with a power unit, a winch and an elevator carried by said structure and deriving power from said power unit, a normally disengaged clutch for controlling the operation of said winch, a lever for engaging said clutch, a locking device for automatically locking said lever in the engaged position, a fork connected by a cable with the drum of said winch for feeding loose material to said elevator and means operated by said fork prior to the end of each feeding operation for releasing said locking device and allowing said clutch to be disengaged.

3. A material handling machine comprising a supporting structure, a normally rotating power shaft, a winch, a normally rotating winch shaft on which said winch is mounted, a normally disengaged clutch for connecting said winch to rotate with said winch shaft, a lever for engaging said clutch, a locking lever engaging said clutch lever and so mounted on a relatively fixed part that its free end portion engaging said clutch lever drops by gravity to lock said clutch lever in clutch engaging position after said clutch lever has been moved to that position, a loading device, and a flexible connection between said winch and loading device, in combination with manual means for moving said clutch lever to clutch engaging position and means to be engaged by said loading device as the latter approaches the end of its travel under the pull of said flexible connecting means to automatically release said locking means whereby the clutch lever is free to move to its disengaged clutch position.

LESLIE BASIL THWAITES.